United States Patent
Trinks

(10) Patent No.: US 10,487,748 B2
(45) Date of Patent: Nov. 26, 2019

(54) COOLING AIR FOR GAS TURBINE ENGINE WITH SUPERCHARGED LOW PRESSURE COMPRESSOR

(71) Applicant: UNITED TECHNOLOGIES CORPORATION, Farmington, CT (US)

(72) Inventor: Steven W. Trinks, Wallingford, CT (US)

(73) Assignee: United Technologies Corporation, Farmington, CT (US)

( * ) Notice: Subject to any disclaimer, the term of this patent is extended or adjusted under 35 U.S.C. 154(b) by 438 days.

(21) Appl. No.: 15/368,815

(22) Filed: Dec. 5, 2016

(65) Prior Publication Data

US 2018/0156133 A1 Jun. 7, 2018

(51) Int. Cl.
| | | |
|---|---|---|
| *F02C 7/36* | (2006.01) | |
| *F02C 7/18* | (2006.01) | |
| *F02C 3/107* | (2006.01) | |
| *F02K 3/06* | (2006.01) | |
| *F02C 9/18* | (2006.01) | |

(52) U.S. Cl.
CPC ........... *F02C 7/36* (2013.01); *F02C 3/107* (2013.01); *F02C 7/185* (2013.01); *F02C 9/18* (2013.01); *F02K 3/06* (2013.01); *F05D 2220/323* (2013.01); *F05D 2240/20* (2013.01); *F05D 2260/213* (2013.01); *F05D 2260/4031* (2013.01); *F05D 2260/40311* (2013.01)

(58) Field of Classification Search
CPC .. F02C 9/18; F02C 7/185; F02C 3/107; F05D 2220/323
See application file for complete search history.

(56) References Cited

U.S. PATENT DOCUMENTS

| | | | |
|---|---|---|---|
| 8,127,829 B2 | 3/2012 | Sabatino et al. | |
| 8,776,869 B2 | 7/2014 | Barnes et al. | |
| 9,243,850 B1 | 1/2016 | Bastian et al. | |
| 2013/0259651 A1 | 10/2013 | Kupratis et al. | |
| 2016/0032779 A1* | 2/2016 | Sawyers-Abbott | ......................... F01D 25/246 60/805 |
| 2016/0237908 A1 | 8/2016 | Snape et al. | |
| 2016/0305261 A1* | 10/2016 | Orosa | ..................... F01D 15/10 |
| 2018/0066586 A1* | 3/2018 | Brostmeyer | ............ F01D 25/08 |

FOREIGN PATENT DOCUMENTS

| | | |
|---|---|---|
| EP | 2128404 | 12/2009 |
| WO | 2015/006162 A1 | 1/2015 |

OTHER PUBLICATIONS

European Search Report for EP Application No. 17205133.6 dated Apr. 17, 2018.

* cited by examiner

*Primary Examiner* — Hieu T Vo
*Assistant Examiner* — Arnold Castro
(74) *Attorney, Agent, or Firm* — Carlson, Gaskey & Olds, P.C.

(57) ABSTRACT

A gas turbine engine has a fan driven by a fan drive turbine through a gear reduction, a low pressure compressor and a high pressure compressor. The high pressure compressor is driven by a high pressure turbine and the low pressure compressor is driven by a low pressure compressor drive turbine through a mechanical transmission that increases the speed of the low pressure compressor relative to the low pressure compressor drive turbine. A tap taps air from the low pressure compressor and delivers the tapped air as cooling air to the high pressure turbine.

11 Claims, 2 Drawing Sheets

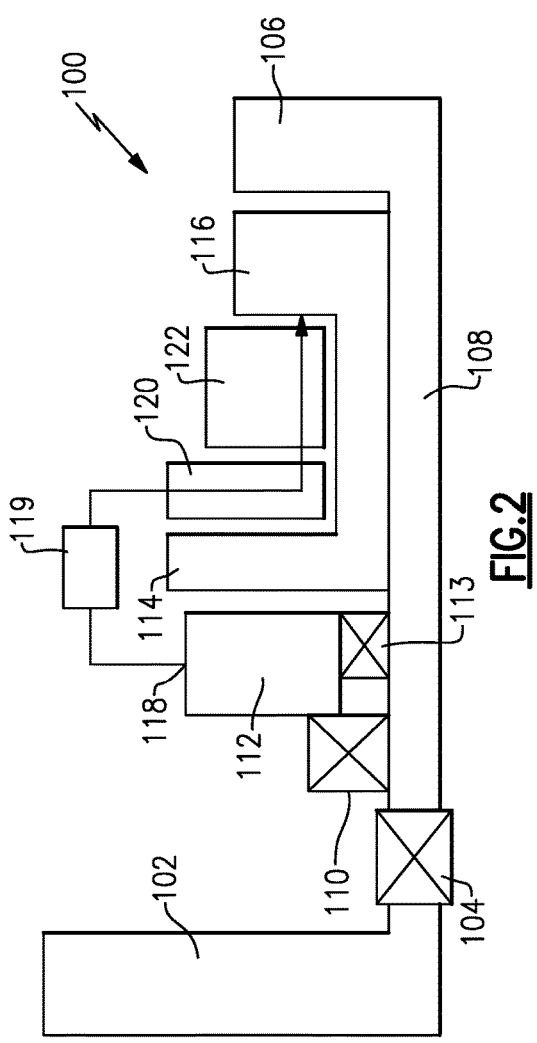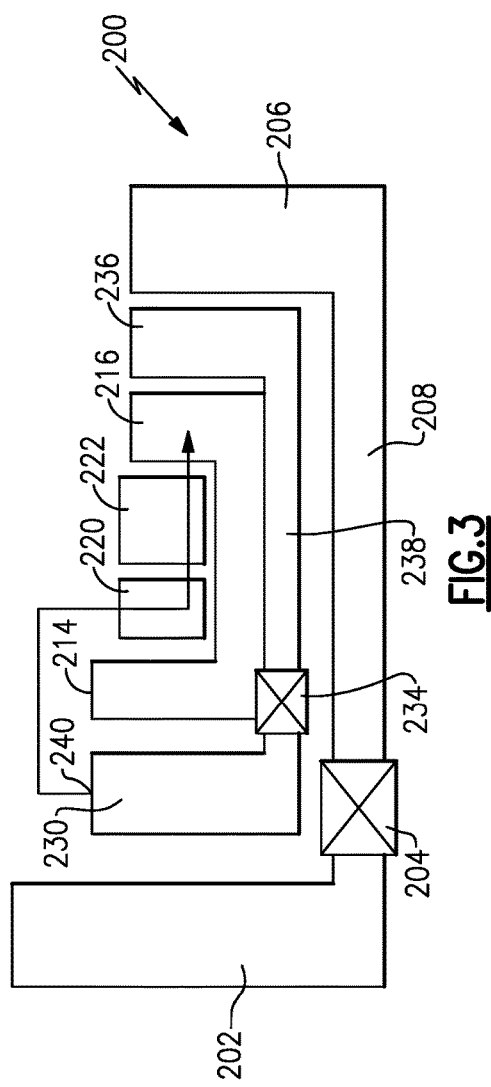

COOLING AIR FOR GAS TURBINE ENGINE WITH SUPERCHARGED LOW PRESSURE COMPRESSOR

BACKGROUND OF THE INVENTION

This application relates to providing cooling air from a low pressure compressor to downstream locations in need of cooling.

Gas turbine engines are known and typically include a fan delivering air into a bypass duct as propulsion air and further providing air into a core housing. Air in the core housing passes into a compressor where it is compressed and then into a combustor where it is mixed with fuel and ignited. Products of this combustion pass downstream over turbine rotors driving them to rotate.

As is known, turbine components are exposed to very high temperatures and thus cooling air has been typically provided to those components. Historically, the fan and a low pressure compressor have rotated as a single unit along with a low pressure, or fan drive, turbine. However, more recently, a gear reduction has been placed between the fan rotor and the fan drive turbine. This allows the fan rotor to rotate at slower speeds and the fan drive turbine to rotate at faster speeds. This raises challenges on the turbine components and requires more efficient provision of the cooling air.

At the same time, the overall pressure ratio provided by the compressor has increased. Historically, the air to cool the turbine components has been tapped from a location downstream of a highest pressure location on the compressor. However, with the increase in overall pressure ratio, this air has become hotter. In addition, utilizing this fully compressed air is costly to the efficiency of the engine.

SUMMARY OF THE INVENTION

In a featured embodiment, a gas turbine engine has a fan driven by a fan drive turbine through a gear reduction, a low pressure compressor and a high pressure compressor. The high pressure compressor is driven by a high pressure turbine and the low pressure compressor is driven by a low pressure compressor drive turbine through a mechanical transmission that increases the speed of the low pressure compressor relative to the low pressure compressor drive turbine. A tap taps air from the low pressure compressor and delivers the tapped air as cooling air to the high pressure turbine.

In another embodiment according to the previous embodiment, the tapped air passes through a heat exchanger before being delivered to the high pressure compressor.

In another embodiment according to any of the previous embodiments, air downstream of the heat exchanger passes through a diffuser downstream of the high pressure compressor before passing to the high pressure turbine.

In another embodiment according to any of the previous embodiments, the fan drive turbine drives a shaft which drives the gear reduction for the fan rotor, and the fan drive turbine also being the low pressure compressor turbine.

In another embodiment according to any of the previous embodiments, there is an intermediate pressure turbine and there are three turbine rotors with the intermediate pressure rotor being the low pressure compressor drive turbine.

In another embodiment according to any of the previous embodiments, a gear ratio of the gear reduction is greater than or equal to 2.3.

In another embodiment according to any of the previous embodiments, the gear reduction is an epicyclic gear reduction.

In another embodiment according to any of the previous embodiments, the heat exchanger sits in a bypass duct and the fan delivering air into the bypass duct as propulsion air, and into a core engine housing to pass to the low pressure compressor.

In another embodiment according to any of the previous embodiments, the fan drive turbine drives a shaft which drives the gear reduction for the fan rotor, and the fan drive turbine also being the low pressure compressor turbine.

In another embodiment according to any of the previous embodiments, a gear ratio of the gear reduction is greater than or equal to 2.3.

In another embodiment according to any of the previous embodiments, the gear reduction is an epicyclic gear reduction.

In another embodiment according to any of the previous embodiments, the heat exchanger sits in a bypass duct and the fan delivering air into the bypass duct as propulsion air, and into a core engine housing to pass to the low pressure compressor.

In another embodiment according to any of the previous embodiments, there is an intermediate pressure turbine and there are three turbine rotors with the intermediate pressure rotor being the low pressure compressor drive turbine.

In another embodiment according to any of the previous embodiments, a gear ratio of the gear reduction is greater than or equal to 2.3.

In another embodiment according to any of the previous embodiments, the gear reduction is an epicyclic gear reduction.

In another embodiment according to any of the previous embodiments, the heat exchanger sits in a bypass duct and the fan delivering air into the bypass duct as propulsion air, and into a core engine housing to pass to the low pressure compressor.

In another embodiment according to any of the previous embodiments, a gear ratio of the gear reduction is greater than or equal to 2.3.

In another embodiment according to any of the previous embodiments, the gear reduction is an epicyclic gear reduction.

In another embodiment according to any of the previous embodiments, the gear reduction is an epicyclic gear reduction.

In another embodiment according to any of the previous embodiments, the tapped air passing through a heat exchanger that sits in a bypass duct and the fan delivering air into the bypass duct as propulsion air, and into a core engine housing to pass to the low pressure compressor.

These and other features may be best understood from the following drawings and specification.

BRIEF DESCRIPTION OF THE DRAWINGS

FIG. 2 schematically shows a first embodiment.
FIG. 3 schematically shows a second embodiment.

DETAILED DESCRIPTION

Figure 1:
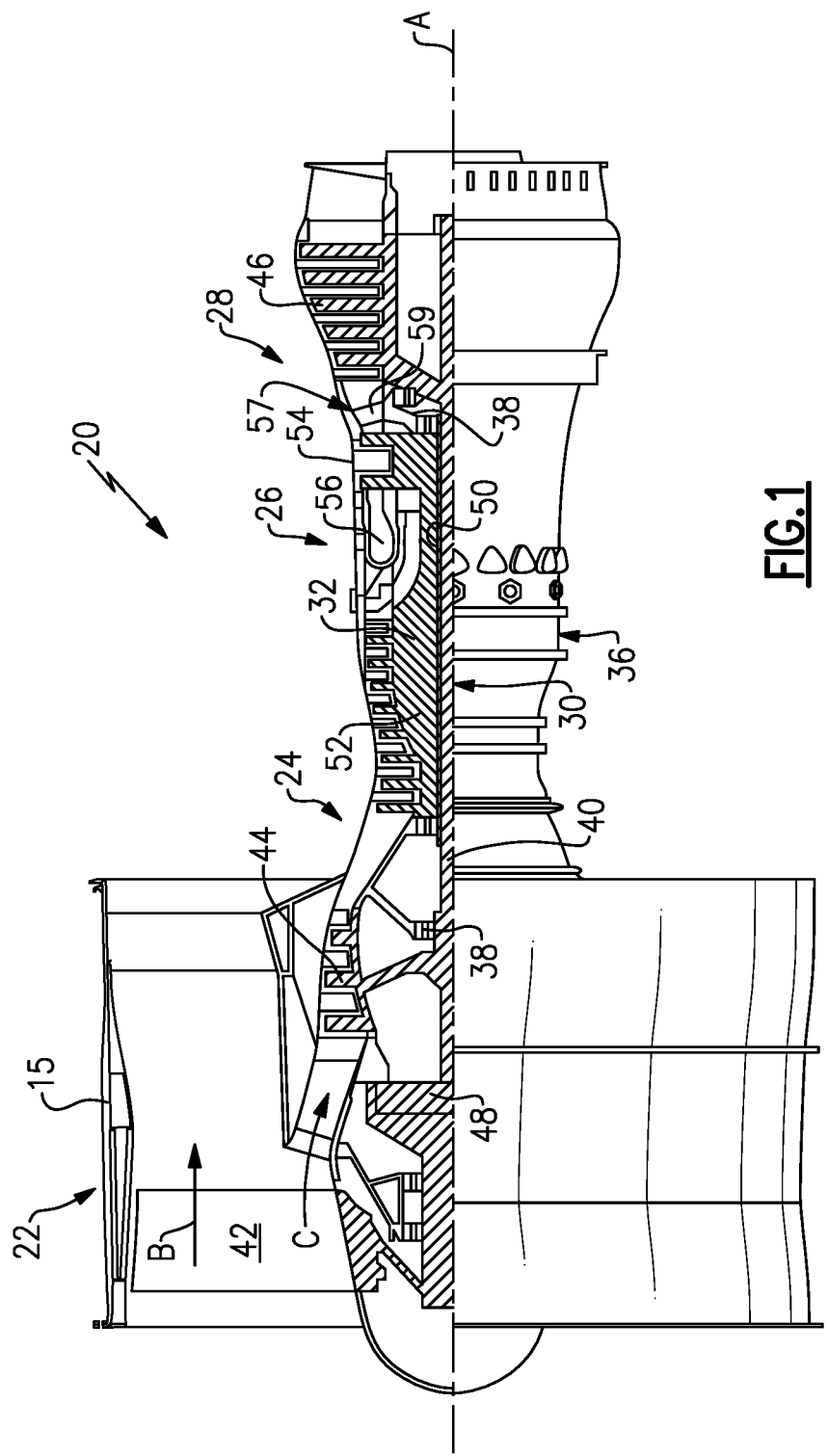
FIG. 1 schematically shows a geared gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R.)/(518.7°\ R.)]^{0.5}$. The "Low corrected fan tip speed" as disclosed herein according to one non-limiting embodiment is less than about 1150 ft/second (350.5 meters/second).

FIG. 2 shows an engine 100 with a turbine cooling system. Features may be generally similar to those mentioned with regard to FIG. 1. A fan 102 is driven through a gear reduction 104 by a fan drive or low pressure turbine 106. A shaft 108 connects the fan drive turbine 106 to the gear reduction 104. Another gear transmission 110 selectively drives a low pressure compressor 112 from the shaft 108. The transmission 110 is shown schematically, but will increase the speed of the low pressure compressor 112 relative to the speed of the shaft 108. An epicyclic gear, such as a planetary system, may be used. Note that since compressor 112 is not tied to shaft 108, a bearing and support 113 is included.

Downstream of the low pressure compressor is a high pressure compressor 114 driven by a high pressure turbine 116. Cooling air is tapped at 118 and passes through an optional heat exchanger 119, which may be in a bypass duct, such as shown in FIG. 1. That cooled air passes back into a core engine such as through struts in a diffuser 120 downstream of the high pressure compressor 114. A combustor 122 is illustrated, as known. The cooling air passes along a radially inner location to reach the high pressure turbine 116 and provide cooling.

There is a speed increase of the low pressure compressor 112 due to the transmission 110. The pressure achievable in the low pressure compressor 112 is increased, such that the cooling air tapped at 118 is at a high enough pressure that it can enter the high pressure turbine 116 and provide the cooling function.

The pressure downstream of the low pressure compressor will increase by about 11 lbm/sec for each 1000 RPM increase in speed. This pressure increase can be utilized to select an appropriate gear ratio for transmission 110.

An alternative embodiment 200 is shown in FIG. 3. Alternative embodiment 200 includes elements which are similar to those shown in FIG. 2. The elements that are similar are increased to 200 numbers, and not described further.

However, there are now three turbine rotors 216, 236, and 206. The fan drive turbine 206 drives a shaft 208 to drive a fan rotor 202 through a gear reduction 204. An intermediate pressure turbine 236 drives the transmission 234 to rotate the low pressure compressor 230 at a higher speed than the intermediate pressure turbine 236. A high pressure turbine 216 drives a high pressure compressor 214. Air is tapped at 240 from the low pressure compressor 230 and passes back through struts in a diffuser 220 to pass along to the combustor 222 and cool the high pressure turbine 216.

The embodiments shown in FIGS. 2 and 3 provide cooling from air taken from the low pressure compressor and thus increases the efficiency of the engine.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a fan driven by a fan drive turbine through a gear reduction, a low pressure compressor and a high pressure compressor, with said high pressure compressor driven by a high pressure turbine and said low pressure compressor driven by a low pressure compressor drive turbine through a mechanical transmission that increases the speed of said low pressure compressor relative to said fan drive turbine; and
a tap for tapping air from said low pressure compressor and connected for delivering the tapped air though a heat exchanger, and to said high pressure turbine;
wherein said fan drive turbine drives a shift which drives said gear reduction for said fan rotor, and said fan drive turbine also being said low pressure compressor turbine.

2. The gas turbine engine as set forth in claim 1, wherein the tapped air passes through a heat exchanger before being delivered to said high pressure compressor.

3. The gas turbine engine as set forth in claim 2, wherein air downstream of said heat exchanger passes through a diffuser downstream of said high pressure compressor before passing to said high pressure turbine.

4. The gas turbine engine as set forth in claim 3, wherein a gear ratio of said gear reduction is greater than or equal to 2.3.

5. The gas turbine engine as set forth in claim 4, wherein said gear reduction is an epicyclic gear reduction.

6. The gas turbine engine as set forth in claim 5, wherein said heat exchanger sits in a bypass duct and said fan delivering air into said bypass duct as propulsion air, and into a core engine housing to pass to said low pressure compressor.

7. The gas turbine engine as set forth in claim 1, wherein said gear reduction is an epicyclic gear reduction.

8. The gas turbine engine as set forth in claim 1, wherein said heat exchanger sits in a bypass duct and said fan delivering air into said bypass duct as propulsion air, and into a core engine housing to pass to said low pressure compressor.

9. The gas turbine engine as set forth in claim 1, wherein a gear ratio of said gear reduction is greater than or equal to 2.3.

10. The gas turbine engine as set forth in claim 9, wherein said gear reduction is an epicyclic gear reduction.

11. The gas turbine engine as set forth in claim 1, wherein said gear reduction is an epicyclic gear reduction.

* * * * *